US012793438B2

(12) United States Patent
Hempel et al.

(10) Patent No.: US 12,793,438 B2
(45) Date of Patent: Nov. 10, 2026

(54) DEVICE AND METHOD FOR DETECTING A NON-RELEVANT SIGNAL GENERATOR

(71) Applicant: Bayerische Motoren Werke Aktiengesellschaft, Munich (DE)

(72) Inventors: Wolfgang Hempel, Sinzing (DE); Martin Liebner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 300 days.

(21) Appl. No.: 18/034,272

(22) PCT Filed: Oct. 22, 2021

(86) PCT No.: PCT/EP2021/079364
§ 371 (c)(1),
(2) Date: Apr. 27, 2023

(87) PCT Pub. No.: WO2022/090082
PCT Pub. Date: May 5, 2022

(65) Prior Publication Data
US 2023/0316776 A1 Oct. 5, 2023

(30) Foreign Application Priority Data
Oct. 28, 2020 (DE) ..................... 10 2020 128 388.1

(51) Int. Cl.
*G06V 20/00* (2022.01)
*B60W 60/00* (2020.01)
(Continued)

(52) U.S. Cl.
CPC ......... *G06V 20/584* (2022.01); *B60W 60/001* (2020.02); *G01C 21/3811* (2020.08);
(Continued)

(58) Field of Classification Search
CPC .................... G06V 20/584; G06T 7/70; G06T 2207/30252; B60W 60/001;
(Continued)

(56) References Cited

U.S. PATENT DOCUMENTS

2016/0318490 A1* 11/2016 Ben Shalom ............. B60T 7/22
2018/0112997 A1* 4/2018 Fasola ................ G01C 21/3691
(Continued)

OTHER PUBLICATIONS

"Rechtsfolgen zunehmender Fahrzeugautomatisierung", Bundesanstalt fuer Strassenwesen (BASt) [German Federal Highway Research Institute], Forschung kompakt [Research News] , Edition Nov. 2012 with English Abstract (two (2) pages).
(Continued)

*Primary Examiner* — Tiffany P Young
(74) *Attorney, Agent, or Firm* — Crowell & Moring LLP

(57) ABSTRACT

A device for detecting a signal generator that is not relevant for motor vehicles determines environment data from one or more environment sensors of at least one motor vehicle during at least one journey at a junction, determines, on the basis of the environment data, information about the position and/or orientation of a plurality of signal generators at the junction with respect to one another and/or with respect to a stop line at the junction. Furthermore, the device identifies at least one non-relevant signal generator from the plurality of signal generators on the basis of the information about the position and/or orientation.

18 Claims, 3 Drawing Sheets

(51) Int. Cl.

| | |
|---|---|
| ***G01C 21/00*** | (2006.01) |
| ***G06T 7/00*** | (2017.01) |
| ***G06T 7/70*** | (2017.01) |
| ***G06V 20/58*** | (2022.01) |
| *H04N 7/18* | (2006.01) |

(52) U.S. Cl.
CPC ............ *G01C 21/3837* (2020.08); *G06T 7/70* (2017.01); *B60W 2420/403* (2013.01); *B60W 2555/00* (2020.02); *G06T 2207/30252* (2013.01); *H04N 7/183* (2013.01)

(58) Field of Classification Search
CPC ........ B60W 2555/00; B60W 2420/403; G01C 21/3811; G01C 21/3837; H04N 7/183
USPC .............................................................. 701/25
See application file for complete search history.

(56) References Cited

U.S. PATENT DOCUMENTS

| | | | | |
|---|---|---|---|---|
| 2018/0300566 | A1* | 10/2018 | Qin ...................... | G06V 20/584 |
| 2021/0064894 | A1* | 3/2021 | Ikezawa ................. | G08G 1/166 |
| 2021/0303882 | A1* | 9/2021 | Mallela ................ | G06V 20/584 |

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).
Chinese-language Office Action issued in Chinese Application No. 202180073814.6 dated Dec. 11, 2025, with partial English translation (22 pages).

* cited by examiner

DEVICE AND METHOD FOR DETECTING A NON-RELEVANT SIGNAL GENERATOR

FIELD

The invention relates to a device and a corresponding method for detecting a non-relevant signal generator, in particular a pedestrian traffic light.

BACKGROUND AND SUMMARY

A vehicle may have one or more driving functions which assist the driver of the vehicle when guiding, in particular when longitudinally guiding and/or when laterally guiding, the vehicle. An exemplary driving function for assisting with the longitudinal guidance of a vehicle is the Adaptive Cruise Control (ACC) function which can be used to longitudinally guide the vehicle at a defined set or target driving speed and/or at a defined target distance from a leading vehicle driving in front of the vehicle. In this case, the driving function can also be used at a signaling unit (in particular at a traffic light) at a traffic junction (for instance at an intersection) in order to effect automated longitudinal guidance, for instance automated deceleration, at the signaling unit.

A signaling unit at a junction (wherein the signaling unit has one or more signal generators) can be taken into consideration on the basis of map data, wherein the map data have one or more map attributes with respect to a signaling unit to be taken into consideration and/or with respect to a junction. In this case, the quality of the driving function typically depends on the quality of the available map data.

The present document therefore deals, in particular, with the technical object of increasing the quality of map data with relating to a signaling unit and/or relating to a junction in order to increase the comfort and/or the safety of a driving function, in particular a driving function for automated longitudinal guidance at a signaling unit or at a junction.

The object is achieved by the present disclosure. Advantageous embodiments are also described in the present disclosure. It is pointed out that additional features of a patent claim dependent on an independent patent claim may form, without the features of the independent patent claim or only in combination with a subset of the features of the independent patent claim, a separate invention which is independent of the combination of all features of the independent patent claim and can be made into the subject matter of an independent claim, a divisional application or a subsequent application. This applies in the same manner to technical teachings which are described in the description and may form an invention that is independent of the features of the independent patent claims.

One aspect describes a device for detecting a non-relevant signal generator (in particular a non-relevant traffic light) at a junction (for instance at an intersection). In this case, a non-relevant signal generator may be a signal generator that is not relevant to motor vehicles and/or the operation of a driving function of motor vehicles. Alternatively or additionally, a non-relevant signal generator may be a signal generator which does not need to be taken into consideration for motor vehicles when determining the permission to enter the junction. Exemplary non-relevant signal generators are a pedestrian traffic light and/or a bicycle traffic light. The device may be a unit outside the vehicle (for example a server). Alternatively or additionally, the device may be arranged in a vehicle (for example in order to detect a non-relevant signal generator "online" or in real time when driving through a junction). If appropriate, information relating to a non-relevant signal generator that is already available may be updated in this case.

The device may be configured to determine environmental data from one or more environmental sensors of at least one motor vehicle during at least one journey at the junction. The environmental data may comprise image data from a camera of at least one motor vehicle. The device may be configured, in particular, to determine environmental data from a multiplicity of different motor vehicles and/or from a multiplicity of crossings of the junction, in particular to receive environmental data via a (possibly wireless) communication connection.

The environmental data may have been captured in this case for a particular direction of travel across the junction and/or for a particular entrance to the junction. The environmental data may therefore indicate the view of the junction which a motor vehicle has (in particular which the one or more environmental sensors of a motor vehicle have) when the motor vehicle drives across the junction (in particular across the intersection) in a particular direction of travel and/or on a particular entrance.

The device is also configured to determine, on the basis of the environmental data, position information and/or orientation information for a plurality of different signal generators (in particular traffic lights) at the junction with respect to one another and/or with respect to a stop line at the junction. The plurality of signal generators may comprise the signal generators which can be detected by or are visible to a motor vehicle at the junction in the particular direction of travel and/or on the particular entrance.

The position information for a first signal generator may indicate the longitudinal distance (in the direction of travel) and/or the lateral distance (transverse to the direction of travel) from a second signal generator and/or from the stop line. The orientation information for a first signal generator may indicate the orientation of the first signal generator relative to the orientation of a second signal generator and/or relative to the stop line.

The device is also configured to identify at least one non-relevant signal generator (in particular at least one pedestrian or bicycle traffic light) from the plurality of signal generators on the basis of the position information and/or on the basis of the orientation information.

In particular, the device may be configured to identify, on the basis of the position information, a first signal generator from the plurality of signal generators which has a lateral distance from a second signal generator from the plurality of signal generators and/or from the stop line which is greater than a predefined distance threshold value (which is an indication that the first signal generator is a non-relevant signal generator). Alternatively or additionally, the device may be configured to identify, on the basis of the position information, a first signal generator from the plurality of signal generators which has a longitudinal distance from a second signal generator from the plurality of signal generators and/or from the stop line which is within a predefined distance range (which is an indication that the first signal generator is a non-relevant signal generator).

The first signal generator can then be reliably identified as a non-relevant signal generator on the basis of the one or more indications mentioned above. A signal generator identified as a non-relevant signal generator can then be ignored during the automated longitudinal guidance of a motor vehicle at the junction, thus increasing the quality, the comfort and the safety of the driving function.

The device may be configured to create and/or update map data relating to the junction on the basis of the non-relevant signal generator identified. In particular, a map attribute for the non-relevant signal generator identified may be included in the map data, which map attribute indicates that the non-relevant signal generator identified is a signal generator which is not relevant to motor vehicles (in particular that the non-relevant signal generator is a pedestrian traffic light or a bicycle traffic light). The map data can then be provided for the operation of a driving function for the automated longitudinal guidance in order to increase the quality, the comfort and the safety of the driving function.

The device may be configured, in particular, to determine the number of different relevant signal groups at the junction on the basis of the non-relevant signal generator identified. In particular, it is possible to determine whether a signaling unit at the junction has one or more different relevant signal groups. In this case, the non-relevant signal generator identified may be removed when determining the relevant signal groups. The number of relevant signal groups can therefore be reliably determined in order to enable reliable operation of a driving function.

A further aspect describes a vehicle guidance system for providing a driving function for the automated longitudinal guidance of a vehicle at a junction (having one or more signaling units and/or signal generators).

The vehicle guidance system is configured, when driving on an entrance to the junction, to determine map data relating to the junction. In this case, the map data for different signal generators at the junction may each indicate (for example by means of one or more map attributes) whether or not the signal generator is relevant to motor vehicles.

The vehicle guidance system is also configured to determine environmental data relating to the junction using one or more environmental sensors (in particular using one or more cameras) of the vehicle and to detect a plurality of signal generators at the junction on the basis of the environmental data.

The vehicle guidance system is also configured to determine, on the basis of the map data, which one or more signal generators from the plurality of signal generators are relevant to motor vehicles and which one or more signal generators from the plurality of signal generators are not relevant to motor vehicles. The vehicle guidance system may therefore be configured to create an assignment between the signal generators detected on the basis of the environmental data and the signal generators recorded in the map data.

For this purpose, the vehicle guidance system may be configured to determine, on the basis of the environmental data, position information and/or orientation information for the plurality of signal generators at the junction with respect to one another and/or with respect to a stop line at the entrance to the junction. It is then also possible to determine, on the basis of the position information and/or the orientation information, which one or more signal generators from the plurality of signal generators are relevant to motor vehicles and which one or more signal generators from the plurality of signal generators are not relevant to motor vehicles. In particular, position information (relating to the relative distance) and/or orientation information for the different signal generators from the map data may be compared with the position information and/or orientation information determined on the basis of the environmental data in order to create an assignment between the signal generators detected on the basis of the environmental data and the signal generators recorded in the map data. On the basis of the assignment, it is then possible to determine, for the individual signal generators, which signal generator is relevant and which signal generator is not relevant.

The vehicle guidance system may also be configured to operate the driving function on the basis of the one or more signal generators which are relevant to motor vehicles. If appropriate, the one or more non-relevant signal generators may be ignored during operation of the driving function (in particular when carrying out automated deceleration at a signal generator). The quality, the comfort and the safety of the driving function can therefore be increased.

A further aspect describes a method for detecting a non-relevant signal generator, which is not relevant, in particular, to motor vehicles or to a driving function, at a junction. The method comprises determining environmental data from one or more environmental sensors of at least one motor vehicle during at least one journey at the junction. The method also comprises determining, on the basis of the environmental data, position information and/or orientation information for a plurality of signal generators at the junction with respect to one another and/or with respect to a stop line at the junction. The method also comprises identifying at least one non-relevant signal generator from the plurality of signal generators on the basis of the position information and/or the orientation information.

As already explained above, the driving function described in this document may be designed, in particular, to longitudinally guide the vehicle in an automated manner at and/or in conjunction with a signaling unit (in particular a signal generator). In this case, the driving function may be designed according to SAE level 2. In other words, the driving function may possibly provide automated driving and/or driver assistance (with respect to the longitudinal guidance) according to SAE level 2. The driving function may be restricted to the longitudinal guidance of the vehicle. The lateral guidance of the vehicle may be provided manually by the driver or by a further and/or separate driving function (for example by a lane-keeping assistant) during operation.

Within the scope of the driving function, the vehicle may be longitudinally guided in an automated manner according to a set or target speed and/or according to a target distance from a leading vehicle driving (directly) in front of the vehicle. For this purpose, the driving function may provide a speed controller which sets, in particular controls, the actual driving speed of the vehicle according to the set or target speed. Alternatively or additionally, it is possible to provide a distance controller which sets, in particular controls, the actual distance of the vehicle from the leading vehicle according to the target distance. If there is no relevant leading vehicle or if the leading vehicle is driving faster than the set or target speed, the driving speed of the vehicle may be controlled. Alternatively or additionally, if the leading vehicle is driving more slowly than the set or target speed, the distance of the vehicle from the leading vehicle may be controlled. The driving function may therefore be configured to provide an Adaptive Cruise Control (ACC) driver assistance function.

A vehicle may comprise a user interface for interacting with a user, in particular with the driver, of the vehicle. The user interface may comprise one or more operating elements which make it possible for the user to define the set or target speed and/or the target distance. Alternatively or additionally, the one or more operating elements may make it possible for the user to confirm a previously defined set and/or target speed and/or a previously defined target distance of the vehicle for the operation of the driving function. The one or more operating elements may be designed to be actuated using a hand and/or a finger of the driver. Alternatively or additionally, the one or more operating elements may be arranged on a steering means (in particular on a steering wheel or on a steering handle) of the vehicle.

An exemplary operating element (in particular a plus/minus operating element) is a button and/or a rocker which can be used to increase or reduce the set and/or target speed or the target distance. A further exemplary operating element (in particular a set operating element) is a button which can be used to define a current driving speed of the vehicle as a set and/or target speed and can be used to define a current distance of the vehicle from the leading vehicle as a target distance. A further exemplary operating element (in particular a resume operating element) is a button which can be used to reconfirm or reactivate a set and/or target speed that has previously been set or a target distance which has previously been set.

The user interface may also comprise one or more output elements (for example a screen and/or a loudspeaker and/or a vibration element) which can be used to effect outputs to the user of the vehicle.

Furthermore, the driving function may be configured to take into consideration one or more signaling units on the road (in particular street) and/or travel route used by the vehicle during the automated longitudinal guidance. A signaling unit may be provided for the purpose of defining the right of way at a junction (in particular an intersection) of the road network used by the vehicle. In this case, the definition of the right of way may be variable over time (like, for example, in the case of a light signal installation, for instance a traffic light system, having one or more different signal groups for one or more different directions of travel of the vehicle at the junction) or may be permanently specified (like, for example, in the case of a traffic sign, for instance a stop sign).

During operation of the driving function, data relating to a signaling unit located ahead in the direction of travel of the vehicle may be determined. The data may comprise map data relating to signaling units in the road network used by the vehicle. The map data may each comprise one or more attributes for a signaling unit. The one or more attributes for a signaling unit may indicate or comprise:

- the type of the signaling unit, in particular whether the signaling unit is a light signal installation or a traffic sign; and/or
- the number of different signal groups of the signaling unit for different directions of travel at the junction of the road network at which the signaling unit is arranged or with which the signaling unit is associated; and/or
- the position (for example the GPS coordinates) of the signaling unit and/or of the stop line of the signaling unit within the road network; and/or
- the relative distance of the stop line from the associated signaling unit.

The driving function may be configured to determine the actual position (for example the current GPS coordinates) of the vehicle within the road network using a position sensor (for example a GPS receiver) of the vehicle and/or using odometry. A (for example the next) signaling unit on the travel route of the vehicle can then be detected on the basis of the map data. One or more map attributes relating to the detected signaling unit may also be determined.

Alternatively or additionally, the data relating to a signaling unit located ahead in the direction of travel of the vehicle may comprise environmental data relating to the signaling unit or may be determined on the basis of environmental data. The environmental data may be captured by one or more environmental sensors of the vehicle. Exemplary environmental sensors are a camera, a radar sensor, a lidar sensor, etc. The one or more environmental sensors may be configured to capture sensor data (that is to say environmental data) relating to the environment in front of the vehicle in the direction of travel.

The driving function may be configured to detect, on the basis of the environmental data (in particular on the basis of the sensor data from a camera), that a signaling unit is arranged in front of the vehicle in the direction of travel. An image analysis algorithm, for example, can be used for this purpose. Furthermore, the driving function may be configured to determine the type of the signaling unit (for example light signal installation or traffic sign) on the basis of the environmental data. The driving function may also be configured to determine, on the basis of the environmental data, the (signaling) state of the signaling unit with respect to the permission to drive cross the junction associated with the signaling unit. In particular, the colors (green, amber or red) of the one or more signal groups of a light signal installation can be determined.

The driving function may be configured to take a detected signaling unit into consideration during the automated longitudinal guidance of the vehicle. In particular, the driving function may be configured to determine whether or not the vehicle must stop at the signaling unit, in particular at the stop line of the signaling unit, on the basis of the data relating to the detected signaling unit, in particular on the basis of the color of a light signal from or of a signal group of the signaling unit that is indicated by the data. For example, it is possible to identify that the vehicle must stop since the signal group relevant to the vehicle is red. Alternatively, it is possible to identify that the vehicle need not stop since the signal group relevant to the vehicle is green. In a further example, it is possible to identify that the vehicle must stop since the signaling unit is a stop sign.

The driving function may also be configured to cause the vehicle to be stopped in an automated manner at the detected signaling unit if it is determined that the vehicle must stop at the signaling unit. An automated deceleration process (to a standstill) can be effected for this purpose. In this case, the vehicle can be guided in an automated manner up to or in front of the stop line of the signaling unit. During the automated deceleration process, the driving function can control one or more wheel brakes (for example one or more friction brakes or one or more regenerative brakes) in an automated manner in order to brake the vehicle (to a standstill). In this case, the temporal profile of the effected deceleration may depend on the available braking distance to the detected signaling unit.

Alternatively or additionally, the driving function may be configured to cause the vehicle to be longitudinally guided in an automated manner past the detected signaling unit, in particular across the stop line of the signaling unit, if it is determined that the vehicle need not stop at the signaling unit. In this case, the speed and/or distance control according to the set or target speed and/or according to the target distance from the leading vehicle can be continued.

The driving function may therefore be configured to provide an ACC driving function, taking signaling units into consideration. In this document, the driving function is also referred to as an Urban Cruise Control (UCC) driving function.

As already explained further above, the driving function may be configured to longitudinally guide the vehicle during operation of the driving function in an automated manner on the basis of a target speed and/or on the basis of a target distance from a leading vehicle driving in front of the vehicle. The driving function may also be configured, if a (possibly detected) signaling unit is not taken into consideration in the driving function, to longitudinally guide the vehicle in an automated manner past the signaling unit, in particular beyond the stop line of the signaling unit, on the basis of the target speed and/or on the basis of the target distance, in particular irrespective of the color of a light signal from the signaling unit. The driving function may therefore possibly be operated (if a signaling unit is not taken into consideration) as if the signaling unit (and the associated junction) did not exist.

The driving function may possibly make it possible for the user of the vehicle to configure the driving function via the user interface (for example in a configuration menu). In this case, it is possible to set, if appropriate, whether the driving function is intended to be operated in an automatic mode or is intended to be operated in a manual mode.

In the automatic mode, the driving function can be operated in such a manner that a signaling unit that is detected and is located ahead in the direction of travel is automatically taken into consideration during operation of the driving function (and possibly results in automated deceleration of the vehicle). In particular, the driving function in the automated mode may be configured to take into consideration a signaling unit, which is detected on the basis of map data and/or environmental data, automatically, in particular without confirmation by the user of the vehicle, during the automated longitudinal guidance of the vehicle (for example in order to cause automated deceleration of the vehicle at the detected signaling unit if necessary).

On the other hand, the driving function can be operated in the manual mode in such a manner that the detected signaling unit is taken into consideration during the automated longitudinal guidance of the vehicle only after confirmation by the user of the vehicle (and possibly results in automated deceleration of the vehicle). In particular, the driving function in the manual mode may be configured to output an offer relating to the consideration of the detected signaling unit to the user of the vehicle (via the user interface of the vehicle). For example, it can be displayed on the screen that a signaling unit has been detected and feedback from the user is required (in order to cause the signaling unit to be taken into consideration during the automated longitudinal guidance of the vehicle). The detected signaling unit (in particular the signaling state of the signaling unit) can then (in particular only then) be taken into consideration during the automated longitudinal guidance of the vehicle at the signaling unit when the offer is accepted by the user (for example by actuating an operating element, in particular the set operating element). Automated deceleration of the vehicle at the detected signaling unit is then carried out, if necessary. On the other hand, the driving function may be configured to not take the detected signaling unit (in particular the signaling state of the signaling unit) into consideration and/or to ignore it during the automated longitudinal guidance of the vehicle at the signaling unit if the offer is not accepted by the user. In this case, the speed and/or distance control can be continued (without taking the signaling unit into consideration, in particular as if the signaling unit were not present).

The comfort of the driving function can be increased further by providing different (settable) modes for operating the driving function (in particular the UCC driving function).

The driving function may be designed to inform the user of the driving function about the status of the driving function using the user interface. In particular, the user of the driving function can be informed about whether or not a signaling unit, which is detected and is located ahead in the direction of travel, is taken into consideration during operation of the driving function, in particular during the automated longitudinal guidance of the vehicle.

The driving function may be configured to determine (for example on the basis of the map data and/or the environmental data) whether or not a signaling unit that is located ahead in the direction of travel is or can be taken into consideration during operation of the driving function. If the signaling unit is or can be taken into consideration, an availability output, in particular an availability display, can possibly be output in order to inform the user that the signaling unit located ahead is taken into consideration during the automated longitudinal guidance of the vehicle (and therefore there is automated deceleration of the vehicle at the signaling unit if necessary).

Alternatively or additionally, the driving function may be configured (if it is determined that the signaling unit located ahead is not or cannot be taken into consideration in the driving function) to effect an unavailability output, in particular an unavailability display, (via the user interface) in order to inform the user of the vehicle that the signaling unit located ahead is not taken into consideration during the automated longitudinal guidance of the vehicle (and therefore there is also no automated deceleration of the vehicle on the basis of the signaling state of the signaling unit).

The comfort and the safety of the driving function can be increased further by outputting an availability and/or unavailability output. The availability and/or unavailability outputs may each comprise an optical, acoustic and/or haptic output.

The driving function may be configured to determine that the signaling state of that signal group of the signaling unit which is relevant to the direction of travel of the vehicle changes (for example while the vehicle is moving toward the signal group or while the vehicle is at the signal group). For example, it is possible to detect that a phase changes from red to green.

The driving function may also be configured (in response to the detected phase change) to cause information relating to the changed signaling state of the signal group of the signaling unit to be communicated to the driver of the vehicle. For example, it is possible to cause a symbol of the signaling unit that is detected (and is possibly taken into consideration during the automated longitudinal guidance) to be displayed via an output element (in particular on a screen) of the user interface as long as the signal group has the color red. After a detected phase change to green, the displayed symbol can then be withdrawn if appropriate and the output can be ended. It is therefore possible to reliably communicate to the driver of the vehicle that a (possibly automated) start-up process can be effected (for example by actuating an operating element of the user interface), for example after the vehicle has been at a standstill at the signaling unit.

The driving function may be configured to output a takeover request to the driver of the vehicle if the driving function is aborted. For example, it is possible to identify that the automated longitudinal guidance (on the basis of the set and/or target speed and/or on the basis of the target distance) cannot be continued or is not continued. The driving function can be aborted, for example, if the driver of the vehicle (substantially) intervenes in the longitudinal guidance of the vehicle (for example by virtue of the driver of the vehicle actuating the brake pedal or the accelerator pedal). A takeover request (TOR) can then be output to the driver of the vehicle. The longitudinal guidance must then be effected by the driver again. The safety of the operation of the vehicle can be increased by outputting a takeover request.

A further aspect describes a (road) motor vehicle (in particular an automobile or a truck or a bus or a motorcycle) which comprises the vehicle guidance system for operating a driving function that is described in this document.

A further aspect describes a software (SW) program. The SW program may be configured to be executed on a processor (for example on a control device of a vehicle and/or in a unit outside the vehicle) and to thereby carry out at least one of the methods described in this document.

A further aspect describes a storage medium. The storage medium may comprise a SW program which is configured to be executed on a processor and to thereby carry out at least one of the methods described in this document.

Within the context of the document, the term "automated driving" can be understood as meaning driving with automated longitudinal or lateral guidance or autonomous driving with automated longitudinal and lateral guidance. Automated driving can involve for example driving for a relatively long time on the freeway or driving for a limited time in the context of parking or maneuvering. The term "automated driving" encompasses automated driving with an arbitrary degree of automation. Exemplary degrees of automation are assisted, partly automated, highly automated or fully automated driving. These degrees of automation were defined by the German Federal Highway Research Institute (BASt) (see BASt publication "Forschung kompakt", issue November 2012). In the case of assisted driving, the driver permanently carries out the longitudinal or lateral guidance, while the system performs the respective other function within certain limits. In the case of partly automated driving, the system performs the longitudinal and lateral guidance for a certain period of time and/or in specific situations, wherein the driver must permanently monitor the system as in the case of assisted driving. In the case of highly automated driving, the system performs the longitudinal and lateral guidance for a certain period of time, without the driver having to permanently monitor the system; however, the driver must be able to take over guidance of the vehicle within a certain time. In the case of fully automated driving, the system can automatically manage driving in all situations for a specific application; a driver is no longer required for this application. The four degrees of automation mentioned above correspond to SAE levels 1 to 4 of the SAE J3016 standard (SAE—Society of Automotive Engineering). For example, highly automated driving corresponds to level 3 of the SAE J3016 standard. Furthermore, SAE J3016 also provides SAE level 5 as the highest degree of automation, which is not contained in the definition by the BASt. SAE level 5 corresponds to driverless driving, during which the system can automatically manage all situations like a human driver during the entire journey; a driver is generally no longer required. The aspects described in this document relate, in particular, to a driving function and a driver assistance function which are designed according to SAE level 2.

It should be noted that the methods, apparatuses and systems described in this document can be used both alone and in combination with other methods, apparatuses and systems described in this document. Furthermore, any aspects of the methods, apparatuses and systems described in this document can be combined with one another in various ways. In particular, the features of the claims can be combined with one another in various ways.

The invention is described in more detail below on the basis of exemplary embodiments.

DETAILED DESCRIPTION

As explained at the outset, the present document deals with increasing the reliability, the availability and/or the comfort of a driving function, in particular a driver assistance system, of a vehicle, for example in connection with a signaling unit at a junction of the road used by the vehicle. In particular, the present document deals with providing precise map data for operating a driving function.

Figure 1:
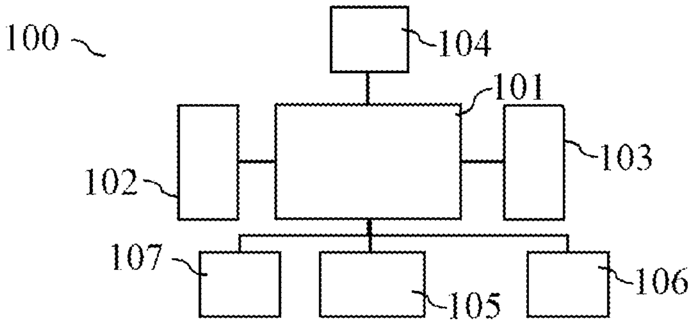
FIG. 1 shows exemplary components of a vehicle.

FIG. 1 shows exemplary components of a vehicle 100. The vehicle 100 comprises one or more environmental sensors 103 (for example one or more imaging cameras, one or more radar sensors, one or more lidar sensors, one or more ultrasonic sensors, etc.) which are configured to capture environmental data relating to an environment of the vehicle 100 (in particular relating to the environment in front of the vehicle 100 in the direction of travel). The vehicle 100 also comprises one or more actuators 102 which are configured to act on the longitudinal and/or lateral guidance of the vehicle 100. Exemplary actuators 102 are: a brake system, a drive motor, a steering system, etc.

The control unit 101 may be configured to provide a driving function, in particular a driver assistance function, on the basis of the sensor data from the one or more environmental sensors 103 (that is to say on the basis of the environmental data). For example, an obstacle on the driving trajectory of the vehicle 100 may be detected on the basis of the sensor data. The control unit 101 can then control one or more actuators 102 (for example the brake system) to decelerate the vehicle 100 in an automated manner and to thereby prevent a collision between the vehicle 100 and the obstacle.

Within the scope of the automated longitudinal guidance of a vehicle 100 in particular, in addition to a leading vehicle, one or more signaling units (for example a light signal installation and/or a traffic sign) on the road or street used by the vehicle 100 may be taken into consideration. In this case, the status of a light signal installation or traffic light system may be taken into consideration, in particular, with the result that the vehicle 100 causes deceleration to the stop line of the traffic light in an automated manner at a red traffic light relevant to the vehicle's own (planned) direction of travel and/or accelerates (possibly again) in the case of a green traffic light.

Light signal installations may be designed in a very heterogeneous manner in different countries and may also be of varying complexity with regard to the direction of travel/light signal assignment. Different directions of travel may therefore be controlled in a bundled manner by means of a first group of signals or by means of one signal group and another direction may be controlled by means of another signal group. The repeating signals from a signal group may also be geographically located at different points of an intersection. It may therefore be difficult for a control unit 101 (also referred to as a vehicle guidance system in this document) to identify, on the basis of the sensor data, which one or more signals from a light signal installation at an intersection are relevant to the planned direction of travel of the vehicle 100 and which are not (in particular if the vehicle 100 is still relatively far away from the light signal installation).

Figure 2A:
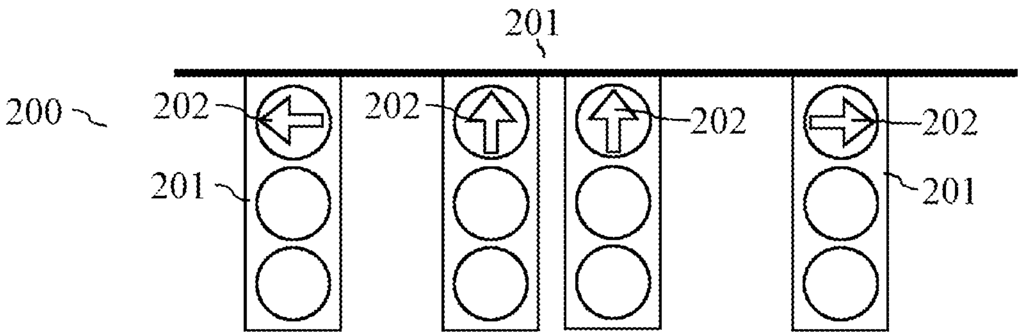
FIG. 2*a* shows an exemplary light signal installation.

FIG. 2*a* shows an exemplary light signal installation 200. The light signal installation 200 illustrated in FIG. 2*a* has four different signal generators 201 which are arranged at different positions at an entrance to an intersection. The left-hand signal generator 201 has an arrow 202 to the left and therefore indicates that this signal generator 201 applies to traffic turning left. The two middle signal generators 201 have an upward arrow 202 (or no arrow 202) and therefore indicate that these two signal generators 201 apply to driving straight ahead. The individual light signals from these two signal generators 201 form signal groups. Furthermore, the right-hand signal generator 201 has an arrow 202 to the right and therefore indicates that this signal generator 201 applies to traffic turning right.

The light signal installation 200 illustrated in FIG. 2*a* is only one example of many different possible configurations of a light signal installation 200. A light signal installation 200 may have a relatively large number of different forms of features. Exemplary features are

- the number of signal generators 201 and/or signal groups;
- the positions of the one or more signal generators 201; and/or
- the assignment of a signal generator 201 to a possible direction of travel across an intersection.

Figure 2B:
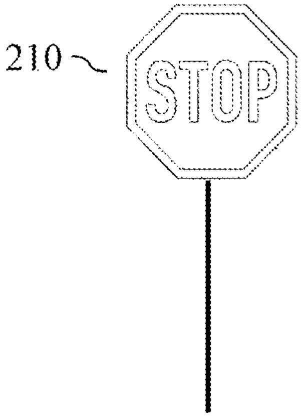
FIG. 2*b* shows an exemplary traffic sign.

FIG. 2*b* shows an exemplary stop sign as a traffic sign 210 which controls the right of way at a traffic junction, in particular at an intersection. The control unit 101 of the vehicle 100 may be configured to detect a traffic sign 210 relevant to the right of way of the vehicle 100 on the street or road used by the vehicle 100 on the basis of the sensor data from the one or more environmental sensors 103 (that is to say on the basis of the environmental data) and/or on the basis of digital map information (that is to say map data).

Figure 3:
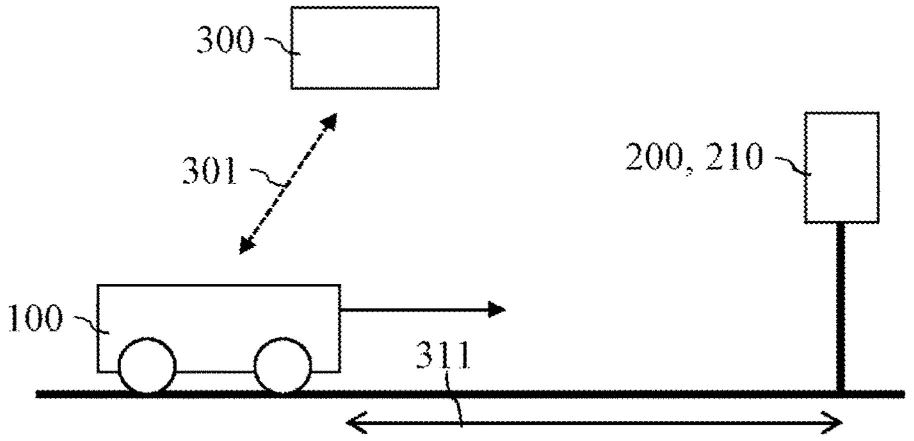
FIG. 3 shows an exemplary traffic situation.

FIG. 3 shows, by way of example, a vehicle 100 which is moving toward a signaling unit 200, 210 (in particular a light signal installation 200 and/or a traffic sign 210) on a road. The one or more environmental sensors 103 of the vehicle 100 may be configured to capture sensor data (in particular image data) relating to the signaling unit 200, 210. The sensor data can then be analyzed (for example by means of an image analysis algorithm) in order to determine forms of one or more features of the signaling unit 200, 210. In particular, it is possible to determine, on the basis of the sensor data, whether the signaling unit 200, 210 is a light signal installation 200 or a traffic sign 210. It is also possible to determine which signal generator 201 of the light signal installation 200 is relevant to the (planned) direction of travel of the vehicle 100. Furthermore, the (signaling) state of the relevant signal generator 201 (for example the color, for instance red, amber or green) can be determined.

The quality and/or the reliability with which the form of a feature of a signaling unit 200, 210 can be determined on the basis of the environmental data is/are typically dependent on the distance 311 of the vehicle 100 from the signaling unit 200, 210. Furthermore, current weather conditions typically also have a significant influence on the quality and/or the reliability of the determined form of a feature. In addition, the quality and/or reliability may be different for different features.

The vehicle 100 may have a storage unit 104 which stores digital map information (that is to say map data) relating to the street network used by the vehicle 100. The map data may indicate, as attributes, forms of one or more features of one or more signaling units 200, 210 in the street or road network. In particular, the map data may indicate, for a light signal installation 200, the assignment of the one or more signal generators 201 or signal groups to different possible directions of travel. In other words, the map data may indicate which signal generator 201 or which signal group is responsible for enabling which direction of travel. The map data may possibly be received at the vehicle 100 by means of a communication unit 105 of the vehicle 100 via a wireless communication connection (for example a WLAN or LTE communication connection).

The control unit 101 of the vehicle 100 may be configured to determine (for example on the basis of the current position of the vehicle 100 and on the basis of a planned travel route and/or on the basis of the environmental data from the one or more environmental sensors 103) that the vehicle 100 is heading for a signaling unit 200, 210 that is located ahead. Furthermore, the control unit 101 may determine the forms of one or more features of the signaling unit 200, 210 located ahead on the basis of the (stored and/or received) map data. In particular, it is possible to determine, on the basis of the map data, which signal generator 201 or which signal group of a light signal installation 200 is assigned to the current or planned direction of travel of the vehicle 100. In addition, the current status of the assigned signal generator 201 or of the assigned signal group can be determined on the basis of the environmental data. An automated driving function (for example automated longitudinal guidance of the vehicle 100) may then be performed in a reliable and comfortable manner on the basis thereof. In particular, the forms of the one or more relevant features of a signaling unit 200 may already be determined in the case of a relatively great distance 311 of the vehicle 100 from the signaling unit 200 by taking the map data into consideration, thus making it possible to increase the reliability, the availability and the comfort of an automated driving function.

A vehicle 100 may be configured to use information relating to a signaling unit 200, 210, which is being or has been passed by the vehicle 100, to create and/or supplement the map data. The map data may be created and/or supplemented locally by the vehicle 100 and/or centrally by a unit 300 outside the vehicle (for example by a backend server) (see FIG. 3). In the immediate vicinity of a signaling unit 200, 210, the one or more environmental sensors 103 of a vehicle 100 can typically capture environmental data which precisely indicate the form of one or more features of the signaling unit 200, 210. In particular, in the immediate vicinity, the assignment between signal generators or signal groups 201 and possible directions of travel may be determined in a precise and reliable manner on the basis of the captured environmental data.

The vehicle 100 may be configured to transmit the determined information (for example the environmental data and/or the determined forms of the one or more features) to the unit 300 outside the vehicle via a wireless communication connection 301 (in conjunction with an identifier for the respective signaling unit 200, 210, for instance in conjunction with the position of the signaling unit 200, 210). The unit 300 outside the vehicle can then create and/or update, on the basis of the information provided by a multiplicity of vehicles 100, map data respectively indicating, as attributes, the forms of one or more features for a multiplicity of different signaling units 200, 210. The map data may then be made available to the individual vehicles 100 in order to (as explained above) assist with the operation of an automated driving function.

Figure 4:
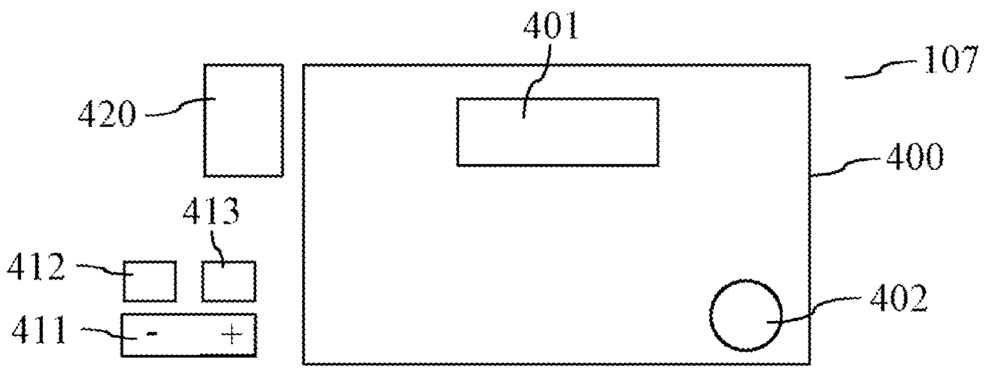
FIG. 4 shows an exemplary user interface.

The vehicle 100 typically comprises a user interface 107 having one or more operating elements and/or one or more output elements. FIG. 4 shows an exemplary user interface 107 having a display unit 400, in particular a screen, for outputting optical information. A suggestion for the automated guidance of the vehicle 100 at a signaling unit 200, 210 located ahead may be output on the display unit 400, for example using a display element 401. Alternatively or additionally, it may be possible to possibly provide a display element 402 which is used to display the status of the driving function (for example active or inactive).

Alternatively or additionally, the user interface 107 may comprise, as an output element, at least one loudspeaker 420 which can be used to output an acoustic output (for example a warning tone) to the driver of the vehicle 100.

Furthermore, the user interface 107 may comprise one or more operating elements 411, 412, 413 which make it possible for the driver of the vehicle 100 to activate and/or parameterize the driving function. An exemplary operating element is a rocker 411 which makes it possible for the driver to define, in particular increase or reduce, a set speed (that is to say a target driving speed) for the vehicle 100. A further exemplary operating element is a set operating element 412 which makes it possible for the driver to define the current driving speed as a set speed and/or to accept a suggestion for the automatic guidance of the vehicle 100 at a signaling unit 200, 210 located ahead (for example in the manual mode of the driving function). Furthermore, the user interface 107 may comprise a resume operating element 413 which makes it possible for the driver, for example, to reactivate the driving function with a previously defined set speed.

The control unit 101 of the vehicle 100 may be designed to provide automated longitudinal guidance of the vehicle 100 in urban areas. This driving function can be referred to, for example, as an Urban Cruise Control (UCC) driving function. In this case, the driving function may be provided in an automatic mode (aUCC) and/or in a manual mode (mUCC). In this case, it may be possible for the driver to define, via the user interface 107, whether the driving function is intended to be operated in the automatic mode or in the manual mode.

The control unit 101 of the vehicle 100 may be configured to detect a signaling unit 200, 210 located ahead on the travel route of the vehicle 100 on the basis of the environmental data from the one or more environmental sensors 103 and/or on the basis of the map data (in conjunction with the position data from the position sensor 106 of the vehicle 100). In the manual mode of the UCC driving function, a suggestion or a request relating to whether or not the signaling unit 200, 210 is intended to be taken into consideration during the automated longitudinal guidance of the vehicle 100 can then be output via the user interface 107. The driver of the vehicle 100 can then accept or reject or ignore the suggestion, for example by actuating the set operating element 412. On the other hand, in the automatic mode of the UCC driving function, the detected signaling unit 200, 210 may possibly be taken into consideration automatically (that is to say without the required feedback from the driver) during the automated longitudinal guidance of the vehicle 100.

If the detected signaling unit 200, 210 is taken into consideration during the automated longitudinal guidance of the vehicle 100, automatic deceleration can be effected (depending on the type and/or (signaling) state of the signaling unit 200, 210) in order to change the vehicle 100 to a standstill in an automated manner (for example in the case of a red traffic light or a stop sign). Furthermore, the vehicle 100 may be automatically started up (for example after the (signaling) state of the signaling unit 200, 210 changes, for instance after a change to green). The vehicle 100 can then be accelerated in an automated manner to the set speed again (taking into consideration a defined minimum or target distance to a leading vehicle).

The UCC driving function can therefore make it possible for the driver of a vehicle 100 to also use the ACC driving function on a street with one or more signaling units 200, 210 (without having to deactivate and reactivate the ACC function in each case at the individual signaling units 200, 210).

The control unit 101 may be configured to determine whether or not a signaling unit 200, 210 located ahead can be taken into consideration during the automated longitudinal guidance on the basis of the environmental data and/or on the basis of the map data. If it is determined that the signaling unit 200, 210 located ahead cannot be taken into consideration during the automated longitudinal guidance, it is possible to effect an output (for example an optical output via a display unit 400, 402) to the driver of the vehicle 100 in order to inform the driver of the vehicle 100 that the signaling unit 200, 210 located ahead cannot be taken into consideration during the automated longitudinal guidance. This display may be referred to as an "unavailability display". The task of the driver of the vehicle 100 is then to decelerate the vehicle 100 if necessary before the signaling unit 200, 210 (for example because the traffic light changes to red or because the signaling unit 200, 210 is a stop sign).

Furthermore, the control unit 101 may be configured to identify, during operation of the UCC driving function, that the vehicle 100 cannot be longitudinally guided (any longer) in an automated manner (for example because the driver has manually intervened in the longitudinal guidance of the vehicle 100). In this case, a takeover request (TOR) can be output to the driver of the vehicle 100 in order to prompt the driver to manually take over the longitudinal guidance of the vehicle 100.

Figure 5:
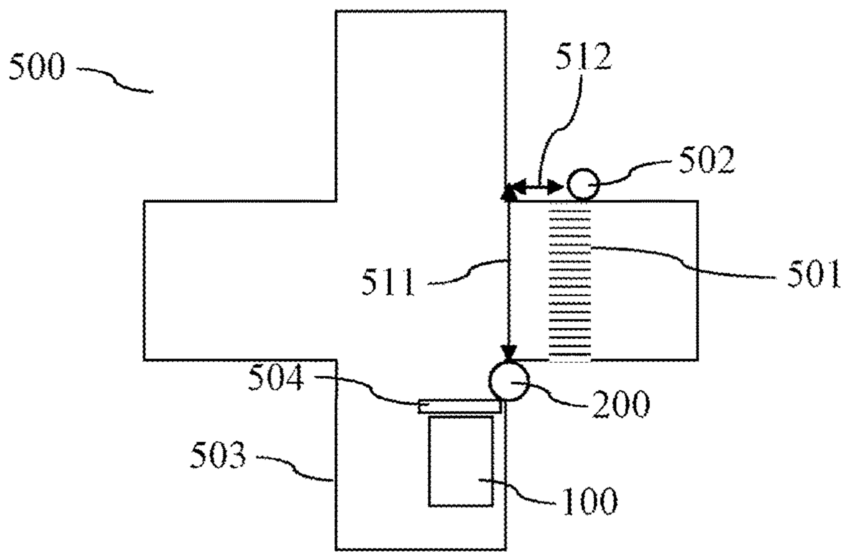
FIG. 5 shows an exemplary junction.

FIG. 5 shows an exemplary junction 500 having a signaling unit 200 (in particular having a signal generator 201 of a signaling unit 200). The vehicle 100 is arranged on an entrance 503 to the junction 500 and may be configured to capture environmental data relating to the environment of the vehicle 100. In this case, the environmental data (in particular the image data from a camera) may indicate the signaling unit 200 relevant to the vehicle 100 (in particular the relevant signal generator 201) at the entrance 503 to the junction 500, in particular to the intersection. Furthermore, the one or more environmental sensors 103 of the vehicle 100 may capture a pedestrian traffic light 502 at a pedestrian crossing 501 of the junction 500. The pedestrian traffic light 502 may have a different signaling state (in particular a different color) than the signaling unit 200 relevant to the vehicle 100 (that is to say the relevant signal generator 201). This may result in the operation of the (UCC) driving function being impaired.

The vehicle guidance system 101 of the vehicle 100 may be configured to determine map data relating to the junction 500 (for example to receive map data from a unit 300 outside the vehicle via a communication connection 301). The map data may indicate a map attribute with respect to the signaling unit 200 and possibly a map attribute with respect to the pedestrian traffic light 502 at the junction 500. In this case, on the basis of the map attributes of the map data, it is possible to determine, for example, distance information relating to the longitudinal distance 511 (in the longitudinal direction or direction of travel of the vehicle 100) and/or relating to the lateral distance 512 (in the transverse direction of the vehicle 100) between the signaling unit 200 and the pedestrian traffic light 502. The distance information (that is to say the position information relating to the relative positioning of the signal generators 200, 502 with respect to one another) can be used by the vehicle guidance system 101 to distinguish the environmental data, which relate to the signaling unit 200, from the environmental data which relate to the pedestrian traffic light 502. The signaling state of the signaling unit 200 relevant to the vehicle 100 can therefore be reliably determined on the basis of the environmental data, thus increasing the reliability of the driving function.

In order to enable the unit 300 outside the vehicle to create a map attribute with respect to a pedestrian traffic light 502, environmental data relating to the junction 500 may be captured from a multiplicity of vehicles 100 and/or during a multiplicity of journeys and may be made available to the unit 300 outside the vehicle. The environmental data (in particular the image data and/or the lidar data) may be evaluated in order to detect and locate one or more signaling units 200 (or signal generators 201) relevant to vehicles 100. Furthermore, geometry information relating to a typical relative arrangement between signaling units 200 relevant to vehicles and pedestrian traffic lights 502 may be taken into consideration in order to detect one or more pedestrian traffic lights 502 (that is to say non-relevant signal generators 201) at the junction 500 on the basis of the environmental data. In particular, when evaluating the environmental data, it is possible to take into consideration the fact that a pedestrian traffic light 502 typically has a certain longitudinal distance 511 and/or a certain lateral distance 512 from a signaling unit 200 relevant to vehicles and, in particular, from the stop line 504 relevant to vehicles.

The internal geometry of the light signal installations 200, 502 at an intersection entrance 503, in particular the relative positions and/or orientations of the different signal generators 201 with respect to one another and/or the relative positions and/or orientations of the different signal generators 201 with respect to the relevant stop line, is therefore taken into consideration in order to reliably distinguish a signal generator 201 which is relevant to the vehicle traffic from a signal generator 201 which is relevant to a pedestrian or cyclist (and not to a motor vehicle 100). In this case, it is possible to take into consideration, in particular, the fact that a pedestrian or bicycle traffic light 502, which can be seen from an intersection arm 503, is positioned differently than a signal generator 201 relevant to vehicles (the pedestrian or bicycle traffic light 502 is typically arranged further back and/or further to the right).

The positions and/or the orientations of different signal generators 201 at the junction 500 may be determined on the basis of the environmental data from one or more vehicles 100 and/or for one or more crossings of the junction 500. In this case, it is also possible to take into consideration the entrance 503 from which the different signal generators 201 can be seen.

The relative positioning and/or the orientation of the different signal generators 201 with respect to one another can then be analyzed in order to decide, for each individual signal generator 201, whether the signal generator 201 is a signal generator relevant to motor vehicles or a pedestrian or bicycle traffic light. This information may be recorded as a map attribute in the map data.

A pedestrian traffic light 502 may be detected, in particular, on the basis of the fact that a pedestrian traffic light 502 typically has a significantly greater lateral distance 512 from the relevant stop line at the entrance 503 than the signal generator 201 relevant to motor vehicles (viewed from the intersection entrance). Furthermore, pedestrian traffic lights 502 are typically in a certain longitudinal distance band 511 from the relevant stop line. On the other hand, the signal generator 201 relevant to motor vehicles is usually directly in front of or at the relevant stop line. This a-priori information can be used to reliably detect pedestrian traffic lights 502.

Figure 6:
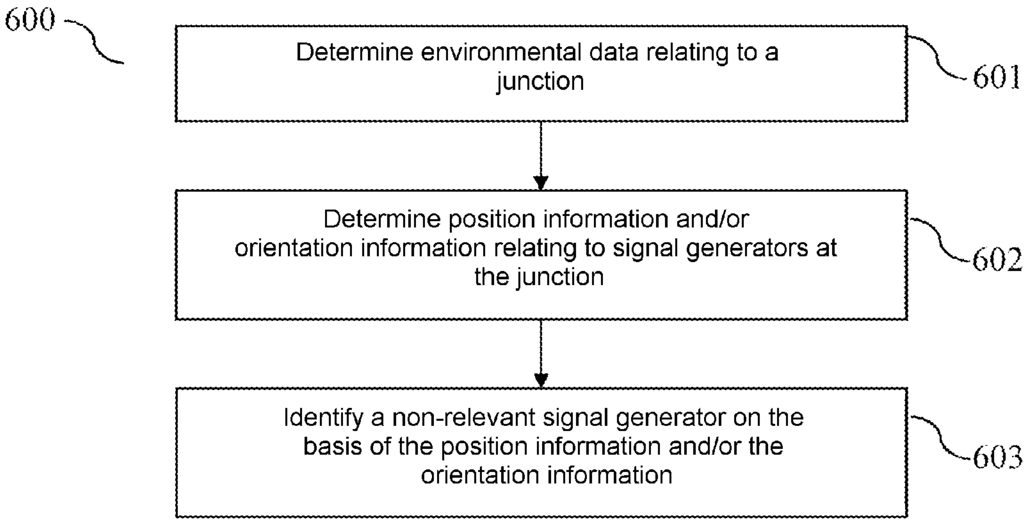
FIG. 6 shows a flowchart of an exemplary method for detecting a pedestrian traffic light at a junction.

FIG. 6 shows a flowchart of an exemplary (possibly computer-implemented) method 600 for detecting a non-relevant signal generator 201, 502, which is not relevant to motor vehicles 100, at a junction 500. The non-relevant signal generator 201, 502 may be, in particular, a pedestrian traffic light or a bicycle traffic light. The method 600 may be carried out by a unit 300 outside the vehicle.

The method 600 comprises determining 601 environmental data from one or more environmental sensors 103 of at least one motor vehicle 100 during at least one journey at the junction 500. Environmental data are typically determined from a multiplicity of motor vehicles 101 and/or for a multiplicity of journeys at the junction 500 (in particular received via a communication connection 301). The environmental data may each have been captured for a particular direction of travel across the junction 500 and/or for a particular entrance 503 to the junction 500.

The method 600 also comprises determining 602, on the basis of the environmental data, position information and/or orientation information for a plurality of signal generators 201 at the junction 500 with respect to one another and/or with respect to a stop line at the junction 500. In this case, the position information may indicate the relative distance 511, 512 of the different signal generators 201 with respect to one another and/or with respect to the stop line. In this case, the longitudinal distance 511 along the direction of travel of a motor vehicle 100 and/or the lateral distance 512 transverse to the direction of travel of the motor vehicle 100 may be indicated.

The method 600 also comprises identifying 603 at least one non-relevant signal generator 201, 502 from the plurality of signal generators 201 on the basis of the position information and/or the orientation information. In this case, it is possible to check, in particular, whether the lateral distance 512 between two signal generators 201 and/or between a signal generator 201 and a stop line exceeds a predefined distance threshold value (which is an indication that one of the signal generators 201 is a non-relevant signal generator 201, 502). Alternatively or additionally, it is possible to check whether the longitudinal distance 511 between two signal generators 201 and/or between a signal generator 201 and a stop line exceeds a predefined distance threshold value and/or is within a predefined distance range (which is an indication that one of the signal generators 201 is a non-relevant signal generator 201, 502).

The measures described in this document make it possible to reliably identify signal generators 201, 502 which are not relevant to motor vehicles, in particular pedestrian traffic lights. The quality of a driving function for the automated longitudinal guidance at a junction 500 may therefore be increased. In particular, precise and reliable automated deceleration at a signal generator 201, 200 (relevant to motor vehicles 100) can therefore be effected.

The present invention is not restricted to the exemplary embodiments shown. In particular, it should be noted that the description and the figures are intended to illustrate only the principle of the proposed methods, apparatuses and systems.

The invention claimed is:

1. A device for detecting a signal generator that is not relevant to at least one motor vehicle along a particular direction of travel of the at least one motor vehicle so that it does not need to be taken into consideration during operation of the at least one motor vehicle along the particular direction of travel, wherein the device comprises:

a processor configured to:

receive environmental data from a plurality of different motor vehicles, including the at least one motor vehicle, via a plurality of communication connections, wherein the environmental data includes environmental data from one or more environmental sensors of each of the plurality of motor vehicles during a plurality of journeys at a junction at least along the particular direction of travel at the junction;

determine, on a basis of the environmental data, position information and/or orientation information for a plurality of signal generators at the junction with respect to one another and/or with respect to a stop line at the junction;

classify, from the plurality of signal generators, at least one signal generator into a first group of non-relevant signal generators that does not need to be taken into consideration during the operation of the at least one motor vehicle along the particular direction of travel, and classify, from the plurality of signal generators, at least one other signal generator into a second group of signal generators that does need to be taken into consideration during the operation of the at least one motor vehicle along the particular direction of travel on a basis of the position information and/or the orientation information; and create and/or update map data relating to the junction and the plurality of signal generators, wherein the map data includes attribute information for various ones of the plurality of signal generators indicating whether it is classified into the first group of non-relevant signal generators or the second group of signal generators for the particular direction of travel, wherein a driving function of the at least one vehicle is operated automatically in the particular direction of travel on a basis of the map data and the attribute information for the at least one signal generator classified in the second group of signal generators.

2. The device according to claim 1, wherein the position information for a first signal generator indicates a longitudinal distance and/or a lateral distance from a second signal generator and/or from the stop line; and/or the orientation information for the first signal generator indicates an orientation of the first signal generator relative to an orientation of a second signal generator and/or relative to the stop line.

3. The device according to claim 1, wherein the processor is further configured to:

identify, on a basis of the position information, a first signal generator of the plurality of signal generators which has a lateral distance from a second signal generator of the plurality of signal generators and/or from the stop line that is greater than a predefined distance threshold value; and responsively classify the first signal generator into the first group of non-relevant signal generators.

4. The device according to claim 1, wherein the processor is further configured to:

identify, on a basis of the position information, a first signal generator of the plurality of signal generators which has a longitudinal distance from a second signal generator of the plurality of signal generators and/or from the stop line that is within a predefined distance range; and responsively classify the first signal generator into the first group of non-relevant signal generators.

5. The device according to claim 1, wherein the at least one signal generator classified into the first group of non-relevant signal generators is a pedestrian traffic light and/or a bicycle traffic light.

6. The device according to claim 1, wherein the environmental data comprises image data from a camera of the at least one motor vehicle.

7. The device according to claim 1, wherein the processor is further configured to determine relevant signal groups of a signaling unit at the junction, wherein the signaling unit comprises the plurality of signal generators, by removing the at least one signal generator classified into the first group of non-relevant signal generators when determining the relevant signal groups.

8. The device according to claim 7, wherein the processor is further configured to determine a number of different relevant signal groups at the junction on a basis of the at least one signal generator classified into the first group of non-relevant signal generators.

9. The device according to claim 8, wherein the map data includes the number of different relevant signal groups as an attribute for the signaling unit.

10. The device according to claim 7, wherein the relevant signal groups are for different directions of travel at the junction.

11. A vehicle guidance system for providing a driving function for automated longitudinal guidance of at least one motor vehicle, the vehicle guidance system comprising:

a processor configured to, when driving on an entrance to a junction:

determine map data relating to the junction, wherein the map data for different signal generators at the junction each includes attribute information that classify whether the signal generator is relevant to the at least one motor vehicle at least according to its direction of travel so that it needs to be taken into consideration during operation of the at least one motor vehicle along the direction of travel, or that the signal generator is not relevant to the at least one motor vehicle at least according to the direction of travel so that it does not need to be taken into consideration during operation of the at least one motor vehicle along the direction of travel, wherein the map data and the attribute information for the different signal generators is preexisting prior to the at least one motor vehicle driving on the entrance to the junction;

determine environmental data relating to the junction using one or more environmental sensors of the vehicle;

detect a plurality of signal generators at the junction on a basis of the environmental data;

determine, on a basis of the map data, including the attribute information for the different signal generators in the map data, and the direction of travel of the vehicle, which one or more signal generators from the plurality of signal generators detected in the environmental data are classified as relevant to the at least one motor vehicle and which one or more signal generators from the plurality of signal generators detected in the environmental data are classified as not relevant to the at least one motor vehicle;

and operate the driving function on a basis of the one or more signal generators which are classified as relevant to the motor vehicle along the direction of travel.

12. The vehicle guidance system according to claim 11, wherein the processor is further configured to:

determine, on a basis of the environmental data, position information and/or orientation information for the plurality of signal generators at the junction with respect to one another and/or with respect to a stop line at the entrance to the junction; and determine, on a basis of the position information and/or the orientation information, which one or more signal generators of the plurality of signal generators are relevant to the at least one motor vehicle and which one or more signal generators of the plurality of signal generators detected in the environmental data are classified as not relevant to the at least one motor vehicle.

13. The vehicle guidance system according to claim 12, wherein the processor is further configured to:

identify, on a basis of the position information, a first signal generator of the plurality of signal generators which has a lateral distance from a second signal generator of the plurality of signal generators and/or from the stop line that is greater than a predefined distance threshold value; and responsively classify the first signal generator as a non-relevant signal generator.

14. The vehicle guidance system according to claim 12, wherein the processor is further configured to:

identify, on a basis of the position information, a first signal generator from the plurality of signal generators which has a longitudinal distance from a second signal generator of the plurality of signal generators and/or from the stop line that is within a predefined distance range; and responsively classify the first signal generator as a non-relevant signal generator.

15. The vehicle guidance system according to claim 11, wherein the processor is further configured to:

determine and/or receive environmental data from a plurality of different motor vehicles and/or from a plurality of crossings of the junction via a communication connection.

16. A method for detecting a non-relevant signal generator that is not relevant to at least one motor vehicle so that it does not need to be taken into consideration during operation of the at least one motor vehicle, the method comprising:

determine map data relating to a junction being approached by the at least one motor vehicle in a direction of travel, wherein the map data, for different signal generators at the junction includes attribute information that classify whether each signal generator is classified into a first group of non-relevant signal generators that are not relevant to the at least one motor vehicle at least according to the direction of travel so that it does not need to be taken into consideration during operation of the at least one motor vehicle along the direction of travel, or into a second group of signal generators that are relevant to the at least one motor vehicle at least according to the direction of travel so that it needs to be taken into consideration during operation of the at least one motor vehicle along the direction of travel, wherein the map data and the attribute information for the different signal generators is preexisting prior to the at least one motor vehicle approaching the junction;

determining environmental data relating to the junction from one or more environmental sensors of the at least one motor vehicle;

detecting a plurality of signal generators at the junction on a basis of the environmental data;

determining, on a basis of the map data including the attribute information for the different signal generators in the map data and the direction of travel of the at least one vehicle, which one or more signal generators from the plurality of signal generators detected in the environmental data are classified into the first group of non-relevant signal generators or the second group of signal generators for the direction of travel; and automatically operating a driving function of the at least one vehicle in the direction of travel on a basis of the plurality of signal generators identified in the environmental data that are determined to be classified into the second group of signal generators for the direction of travel.

17. The method according to claim 16, comprising:

identifying, on a basis of position information, a first signal generator of the plurality of signal generators identified in the environmental data which has a lateral distance from a second signal generator of the plurality of signal generators and/or from the stop line that is greater than a predefined distance threshold value; and responsively classifying the first signal generator into the first group of non-relevant signal generators.

18. The method according to claim 16, comprising:

identifying, on a basis of position information, a first signal generator from the plurality of signal generators identified in the environmental data which has a longitudinal distance from a second signal generator of the plurality of signal generators and/or from the stop line that is within a predefined distance range; and responsively classifying the first signal generator into the first group of non-relevant signal generators.

* * * * *